US008879611B2

(12) United States Patent
Dhayni et al.

(10) Patent No.: US 8,879,611 B2
(45) Date of Patent: Nov. 4, 2014

(54) FULLY-DIGITAL BIST FOR RF RECEIVERS

(71) Applicant: ST-Ericsson SA, Plan-les-Ouates (CH)

(72) Inventors: Achraf Dhayni, Vallauris (FR); Jeroen Kuenen, Beuningen (NL)

(73) Assignee: ST-Ericsson SA, Plan-les-Ouates (CH)

( * ) Notice: Subject to any disclaimer, the term of this patent is extended or adjusted under 35 U.S.C. 154(b) by 93 days.

(21) Appl. No.: 13/629,993

(22) Filed: Sep. 28, 2012

(65) Prior Publication Data
US 2014/0092946 A1 Apr. 3, 2014

(51) Int. Cl.
H04B 17/00 (2006.01)

(52) U.S. Cl.
CPC ............ *H04B 17/004* (2013.01); *H04B 17/008* (2013.01); *H04B 17/0085* (2013.01)
USPC .......................................... 375/224; 375/316

(58) Field of Classification Search
CPC . H04L 12/2697; H04L 41/5038; H04L 43/50; H04B 17/004; H04B 17/008; H04B 17/0085; H04B 17/00; H04B 17/0027; H04B 17/0045
USPC .................. 375/224, 316, 321, 328, 335, 339
See application file for complete search history.

(56) References Cited

U.S. PATENT DOCUMENTS

| | | | | |
|---|---|---|---|---|
| 5,524,281 A | * | 6/1996 | Bradley et al. | 455/67.15 |
| 6,980,786 B1 | * | 12/2005 | Groe | 455/314 |
| 2003/0124999 A1 | * | 7/2003 | Parssinen et al. | 455/226.1 |
| 2004/0105511 A1 | * | 6/2004 | Wieck | 375/317 |
| 2006/0068746 A1 | * | 3/2006 | Feng et al. | 455/323 |
| 2006/0290548 A1 | * | 12/2006 | Goyal et al. | 341/120 |
| 2008/0166978 A1 | * | 7/2008 | Cheah et al. | 455/75 |
| 2008/0182537 A1 | * | 7/2008 | Manku et al. | 455/226.1 |
| 2010/0027689 A1 | * | 2/2010 | Kohlmann | 375/260 |
| 2010/0075709 A1 | * | 3/2010 | Nakano et al. | 455/522 |
| 2010/0081408 A1 | * | 4/2010 | Mu et al. | 455/326 |

(Continued)

FOREIGN PATENT DOCUMENTS

| | | |
|---|---|---|
| DE | 202010014605 U1 | 12/2010 |
| WO | 2011140563 A1 | 11/2011 |

OTHER PUBLICATIONS

Ahmad, S. "Stimuli Generation Techniques for On-Chip Mixed-Signal Test." Linköping Studies in Science and Technology, Dissertation No. 1350, Department of Electrical Engineering, 2010.

(Continued)

*Primary Examiner* — Emmanuel Bayard
(74) *Attorney, Agent, or Firm* — Coats & Bennett, PLLC

(57) ABSTRACT

A built-in receiver self-test system provides on-chip testing with minimal change to the receiver footprint. The system digitally generates a two-tone test signal, and tests the non-linearities of the receiver using the generated two-tone test signal. To that end, the self-test system comprises a stimulus generator, a downconverter, and a demodulator, all of which are disposed on a common receiver chip. The stimulus generator generates a test signal comprising first and second tones at respective first and second frequencies, where the first and second frequencies are spaced by an offset frequency, and where the first frequency comprises a non-integer multiple of the offset frequency. The downcoverter downconverts the test signal to generate an In-phase component and a Quadrature component. The demodulator measures an amplitude of the intermodulation tone by demodulating the In-phase and Quadrature components based on a reference frequency.

32 Claims, 8 Drawing Sheets

(56) References Cited

U.S. PATENT DOCUMENTS

| | | |
|---|---|---|
| 2011/0059709 A1* | 3/2011 | Collins, III .................. 455/226.1 |
| 2011/0128992 A1* | 6/2011 | Maeda et al. .................. 375/130 |
| 2011/0273197 A1* | 11/2011 | Banerjee et al. ........... 324/750.3 |
| 2013/0021048 A1* | 1/2013 | Peng et al. .................. 324/750.3 |
| 2013/0029626 A1* | 1/2013 | Chen et al. .................... 455/334 |
| 2013/0049780 A1* | 2/2013 | Collins, III et al. ........ 324/750.3 |
| 2013/0143501 A1* | 6/2013 | Huang et al. .................... 455/42 |
| 2013/0147500 A1* | 6/2013 | McCune, Jr. ............. 324/750.01 |

OTHER PUBLICATIONS

Webster, D., et al., "How to do RF-BiST with virtually no extra circuits for RF-SoC Products?", 53rd IEEE International Midwest Symposium on Circuits and Systems (MWSCAS), Aug. 1, 2010, pp. 469-472, IEEE, Seattle, WA.

* cited by examiner

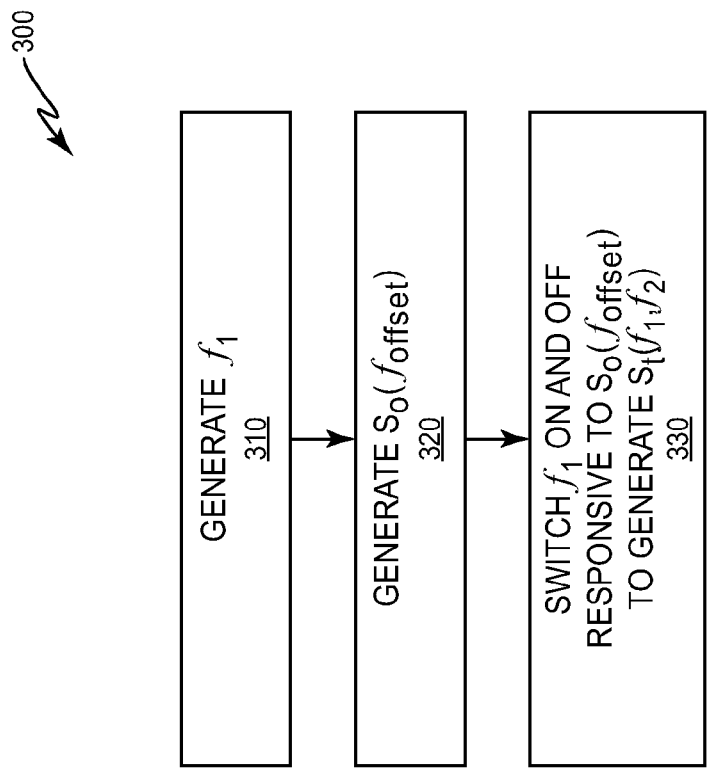

FULLY-DIGITAL BIST FOR RF RECEIVERS

The system and method disclosed herein generally relate to receiver testing, and more particularly relate to built-in self-testing of receiver nonlinearities.

BACKGROUND

Wireless devices rely heavily on the performance of the associated wireless receiver. Thus, testing the performance of a wireless receiver during manufacture and in the field is highly desirable. One way to evaluate the performance of the wireless receiver is by measuring the nonlinearities of the receiver, e.g., the second and third order nonlinearities, which are caused by parasitics and design errors. In fact, the second order intercept point (IP2) is one of the most important receiver test parameters. The IP2 represents the second order nonlinearity of the receiver chain, e.g., of the low-noise amplifier (LNA), the mixer, the low-pass filter (LPF), and the analog-to-digital converter (ADC). Because the IP2 is one of the most important receiver test parameters, measuring the IP2 provides a common way for operators to determine if the receiver is operating within specifications.

Measuring the IP2 requires the generation of a radio frequency (RF) test signal containing two tones at different frequencies, e.g., $f_1$ and $f_2$. Because of the receiver downconversion and because of the second order nonlinearities, applying the test signal to the input of the receiver chain, e.g., the input of the LNA, results in a second order intermodulation tone (IM2) appearing at $f_1 \pm f_2$ at the output of the receiver chain, e.g., the output of the ADC. The IP2 can then be calculated based on the amplitude of the IM2.

Conventional test systems typically generate the two-tone RF test signal using analog functions in an external signal generator system that typically includes two signal generators. Further, conventional test systems typically probe the receiver chain output off-chip. Such off-chip elements may be acceptable for manufacture testing, but generally are not convenient for in the field testing. Thus, there is a need for on-chip testing capabilities. Further, because space is limited on a receiver chip, it is desirable to minimize the footprint of any on-chip components used to test the receiver.

SUMMARY

The built-in receiver self-test system disclosed herein provides on-chip testing with minimal footprint by reusing several receiver components to digitally generate a two-tone test signal, and to test the nonlinearities of the receiver using the generated two-tone test signal. The self-test system comprises a stimulus generator, a downconverter, and a demodulator, all of which are disposed on a common receiver chip. The stimulus generator generates a test signal comprising first and second tones at respective first and second frequencies, where the first and second frequencies are spaced by an offset frequency, and where the first frequency comprises a non-integer multiple of the offset frequency. The downcoverter operatively connects to the stimulus generator and is configured to downconvert the test signal to generate an In-phase component and a Quadrature component. The demodulator operatively connects to the downconverter and is configured to measure an amplitude of the intermodulation tone by demodulating the In-phase and Quadrature components based on a reference frequency.

A corresponding method tests a receiver to measure an intermodulation tone using a built-in self-test system, all the components of which are disposed on a receiver chip. The method comprises generating a test signal using a stimulus generator, where the test signal comprises first and second tones at respective first and second frequencies, where the first and second frequencies are spaced by an offset frequency, and where the first frequency comprises a non-integer multiple of the offset frequency. The method further comprises applying the test signal to a downconverter of the receiver configured to downconvert the test signal to generate an In-phase component and a Quadrature component, and demodulating, in a demodulator of the receiver, the In-phase and Quadrature components based on a reference frequency to measure an amplitude of the intermodulation tone.

In one embodiment, the stimulus generator comprises a first signal generator, a first divider, and a logic gate operatively connected to the output of the first signal generator and the first divider, where the first signal generator, the first divider, and the logic gate are disposed on a receiver chip. It will be appreciated that the first signal generator may reuse components already on-chip for the receiver, e.g., phase-locked loop (PLL) components. The first signal generator generates a first signal at a first frequency based on an oscillator output signal at an oscillator frequency. The first divider divides the oscillator output signal by a first divisor to generate an offset signal at an offset frequency. The logic gate switches the first signal on and off responsive to the offset signal to generate the test signal, where the test signal comprises a first tone at the first frequency and a second tone at a second frequency separated from the first frequency by the offset frequency, and where the first frequency comprises a non-integer multiple of the offset frequency.

A corresponding method generates a test signal for a built-in receiver self-test system used to measure an intermodulation tone. The method comprises generating a first signal at a first frequency based on an oscillator output signal at an oscillator frequency and dividing the oscillator output signal by a first divisor to generate an offset signal at an offset frequency. The method further comprises generating the test signal by switching the first signal on and off responsive to the offset signal, where the test signal comprises a first tone at the first frequency and a second tone at a second frequency separated from the first frequency by the offset frequency, and where the first frequency comprises a non-integer multiple of the offset frequency.

It will be appreciated that the self-test system may reuse and/or be comprised of already existing on-chip receiver components. For example, the first signal generator of the stimulus generator may reuse the receiver's phase-locked loop (PLL), while the test system's downconverter and demodulator may be comprised of the receiver's downconverter and demodulator, respectively. The built-in receiver self-test system may therefore be implemented by adding the divider and the logic gate of the stimulus generator to already existing receiver components on the receiver chip. As a result, the built-in receiver self-test system provides on-chip testing with a single signal generator with a minimal increase to the receiver chip footprint.

BRIEF DESCRIPTION OF THE DRAWINGS

FIG. 5 shows test signal generation method according to one exemplary embodiment.

DETAILED DESCRIPTION

The built-in test system disclosed herein provides an on-chip stimulus generator to generate the two-tone test signal required to test the receiver. To prevent the desired intermodulation tone from overlapping other harmonics of the offset frequency, the first frequency of the test signal generated by the stimulus generator is a non-integer multiple of the offset frequency separating the first and second frequencies of the test signal.

Figure 1:
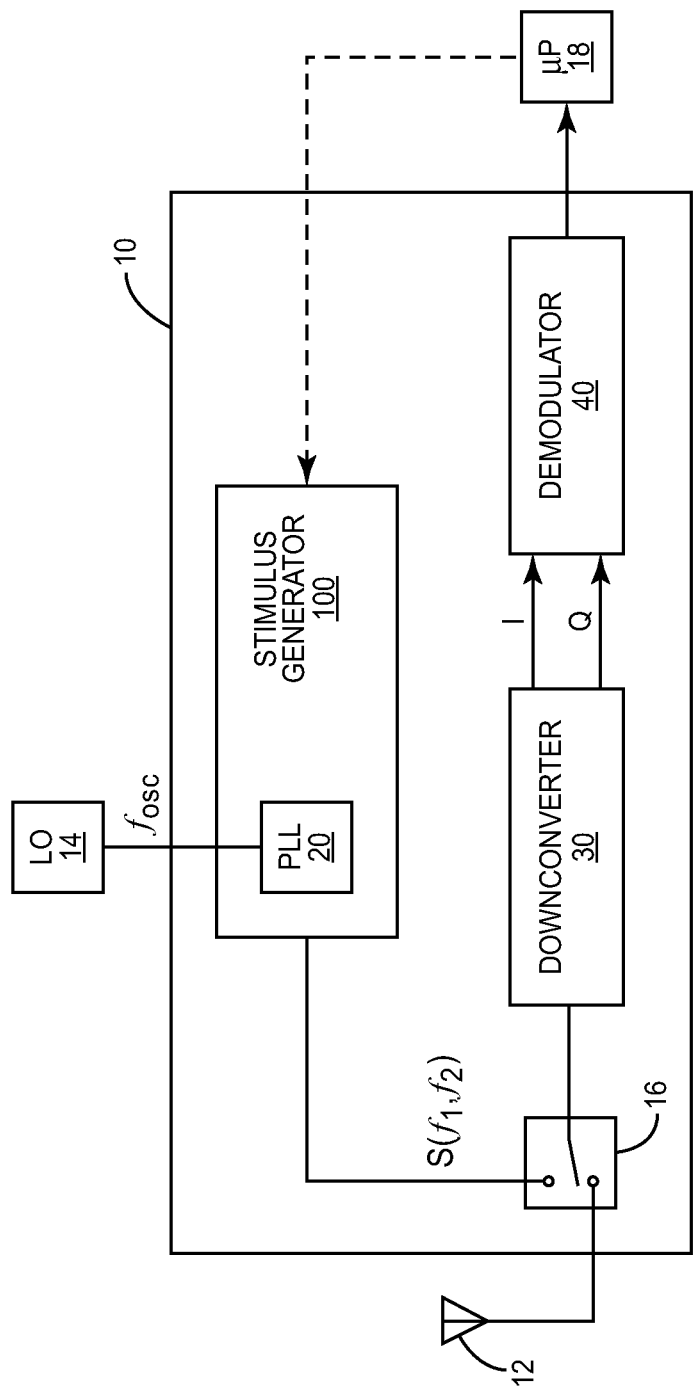
FIG. 1 shows a block diagram of a receiver with a built-in test system according to one exemplary embodiment

FIG. 1 shows a block diagram of a receiver 10 and processor 18 according to one exemplary embodiment. Receiver 10 comprises a stimulus generator 100 comprising a phase-locked loop (PLL) 20 configured to generate a first frequency $f_1$ from a local oscillator frequency $f_{osc}$ output by an off-chip local oscillator 14. The receiver 10 also includes a downconverter 30 and a demodulator 40. The stimulus generator 100, the downconverter 30, and the demodulator 40 are all disposed on a common receiver chip so as to provide on-chip (or "built-in") testing capabilities. While shown as separate from the receiver 10, it will be appreciated that processor 18 may also be disposed on the common receiver chip. As shown in FIG. 1, the built-in receiver self-test system reuses the PLL 20, downconverter 30, and demodulator 40 to measure non-linearities of the receiver 10, and therefore to test the performance of the receiver 10. During normal receiver operations, antenna 12 provides the input signal to the downconverter 30. During testing operations, however, stimulus generator 100 provides the test signal to the downconverter 30. To enable the receiver 10 to selectively switch between testing operations and a receiving operations, receiver 10 may also include a switch 16 that selectively connects the demodulator 30 to the antenna 12 or the stimulus generator 100.

Figure 2:
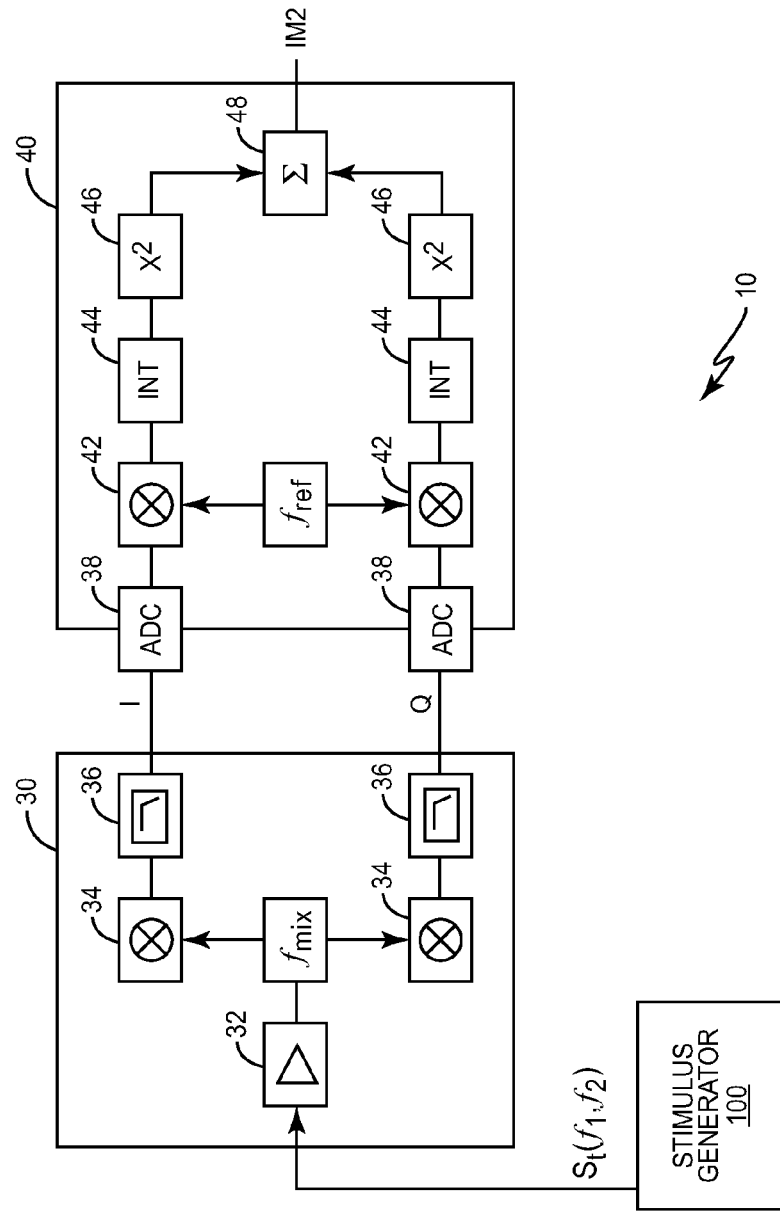
FIG. 2 shows a circuit block diagram of the receiver of FIG. 1 according to one exemplary embodiment.

Downconverter 30 and demodulator 40 may comprise any known circuits that respectively downconvert an input signal to a desired intermediate or baseband frequency using a receiver mixing frequency $f_{mix}$ to generate downconverted In-phase (I) and Quadrature (Q) signals, and demodulate the I and Q signals to generate the desired output signal. FIG. 2 shows one exemplary downconverter 30 and demodulator 40 that may be used for receiver 10. In this example, downconverter 30 comprises a quadrature downconverter that downconverts the input signal (e.g., the received signal or the test signal) responsive to $f_{mix}$ in mixers 34 to generate an In-phase component (I) and a Quadrature component (Q) at an intermediate or baseband frequency based on the mixing frequency $f_{mix}$. As shown in FIG. 2, downconverter 30 may also amplify the input signal in amplifier 32, and may further filter the downconverted I and Q signals in filters 36 to reduce the noise. After the I and Q signals output by the downconverter 30 are digitized (e.g., in analog-to-digital converters 38), the demodulator 40 downconverts the digitized I and Q signals based on a reference frequency $f_{ref}$ using a cordic 42 responsive to $f_{ref}$, where $f_{ref}$ is generated based on $f_{osc}'$ output by oscillator 14. It will be appreciated that the analog-to-digital converters 38 may be part of the downconverter 30, part of the demodulator 40, or separate from both the downconverter 30 and demodulator 40. In any event, demodulator 40 digitally low-pass filters the downconverted signal using an integrator 44, squares the filtered signal in multiplier 46, and combines the In-phase and Quadrature paths in combiner 48 to generate the demodulator output. When the test signal $s_t(f_1,f_2)$ is input to the downconverter 30, the demodulator output comprises an intermodulation tone at $|f_1 \pm f_2|$.

Figure 3:
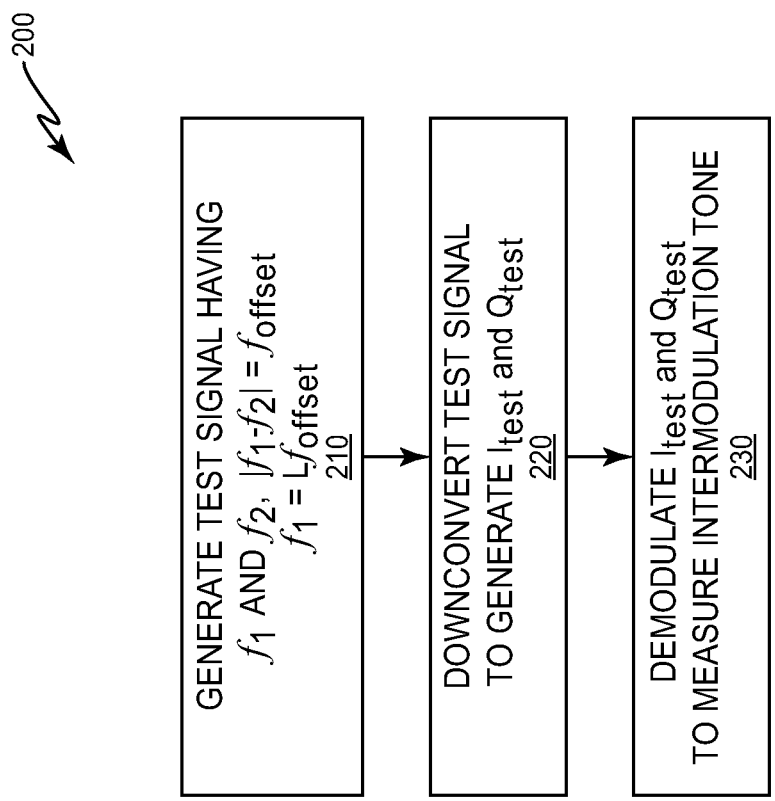
FIG. 3 shows a test method according to one exemplary embodiment.

During testing operations, e.g., when switch 16 connects the downconverter 30 to the stimulus generator 100, receiver 10 executes the method 200 shown in FIG. 3. Accordingly, the stimulus generator 100 generates a test signal $s_t(f_1,f_2)$ using the PLL 20 as discussed further herein (block 210). Test signal $s_t(f_1,f_2)$ comprises a first tone at a first frequency $f_1$ and a second tone at a second frequency $f_2$, where the first and second frequencies are spaced by an offset frequency $f_{offset} = f_1 \pm f_2$ and where $f_1$ is a non-integer multiple of $f_{offset}$. Downconverter 30 downconverts the test signal to generate In-phase ($I_{test}$) and Quadrature ($Q_{test}$) test signals (block 220). Demodulator 40 demodulates $I_{test}$ and $Q_{test}$ using any known demodulation techniques to produce an intermodulation tone, e.g., at $f_{offset}$ (block 230). A processor 18 processes the intermodulation tone output by the demodulator 40 to calculate the desired linearity parameter. It will be appreciated that the intermodulation tone output by demodulator 40 may comprise any intermodulation tone, e.g., a second order intermodulation tone, a third order intermodulation tone, etc., and the calculated linearity parameter may comprise any corresponding linearity parameter, e.g., the second order intercept point, the third order intercept point, etc. For example, the intermodulation tone output by the demodulator 40 may comprise a second order intermodulation (IM2) tone, where the processor 18 uses the amplitude of the IM2 tone to calculate the second order intercept point (IP2) of the receiver 10. It will be appreciated that the processor 18 may be on the receiver chip with the demodulator 40 and downconverter 30, or may be disposed elsewhere in the corresponding device.

Figure 4:
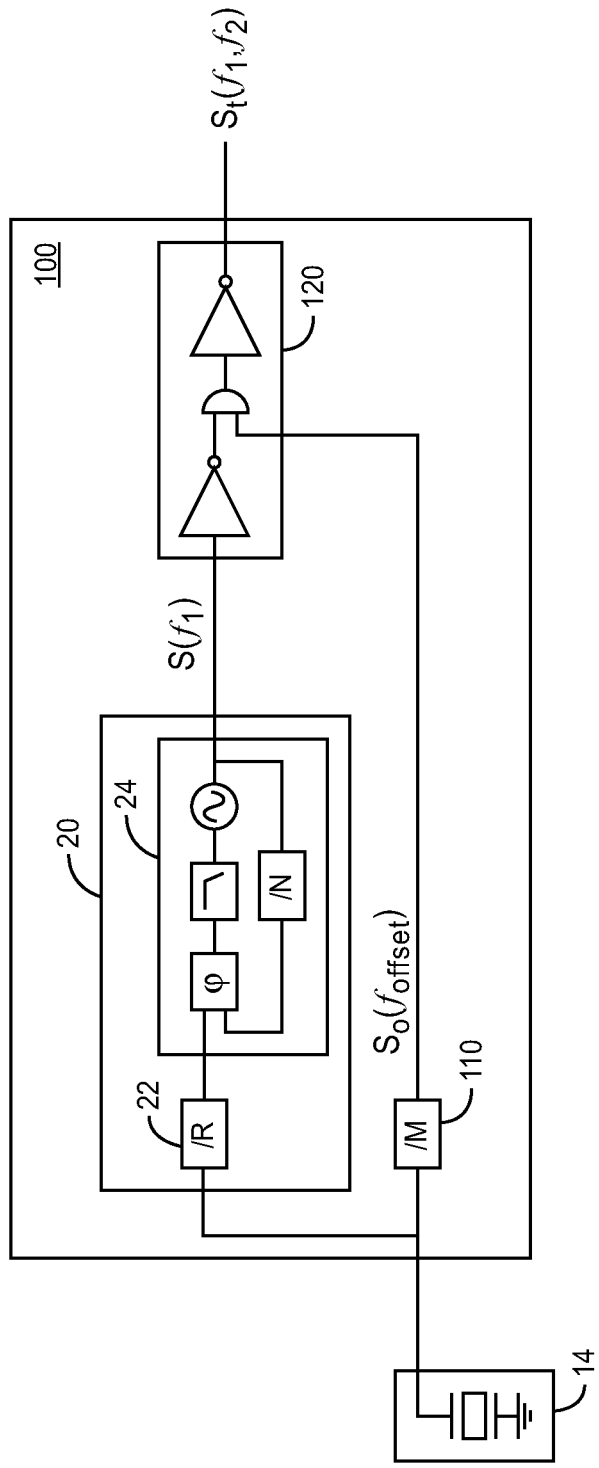
FIG. 4 shows a circuit block diagram of a stimulus generator according to one exemplary embodiment.

FIG. 4 shows a block diagram for one exemplary stimulus generator 100 that reuses the on-chip PLL 20 to generate a two-tone test signal according to the method 300 of FIG. 5. Stimulus generator 100 comprises the PLL 20, a divider 110, and a logic circuit 120. PLL 20 generates $f_1$ from $f_{osc}$ using, for example, a loop divider 22 and an internal loop 24, where loop divider 22 divides $f_{osc}$ by an integer R and internal loop 24 generates $f_1$ based on a comparison between the phase of the signal output by the loop divider 22 and the phase of the PLL output signal $s(f_1)$ as divided by an integer N (block 310). In a second branch of the stimulus generator, divider 110 divides $f_{osc}$ by an integer M to generate an offset signal $s_o(f_{offset})$ at an offset frequency $f_{offset}$ (block 320). Logic circuit 120 switches the output of the PLL 20 on and off responsive to $s_o(f_{offset})$ to amplitude modulate the PLL output signal using $f_{offset}$ (block 330). In so doing, the logic circuit 120 generates the desired two-tone test signal having a first tone $f_1$ and a second tone at a second frequency $f_2$ offset from $f_1$ using a single signal generator, where $f_1 = L f_{offset} = L(f_{osc}/M)$. As discussed further below, in a preferred embodiment L is a non-integer.

In one exemplary embodiment, the logic circuit 120 comprises an AND gate, as shown in FIG. 4. It will be appreciated that any logic circuit configured to amplitude modulate the PLL output signal responsive to the offset frequency may be used. Thus, the logic circuit 120 is not limited to the AND and NOT gates shown in FIG. 4.

Figure 6A:
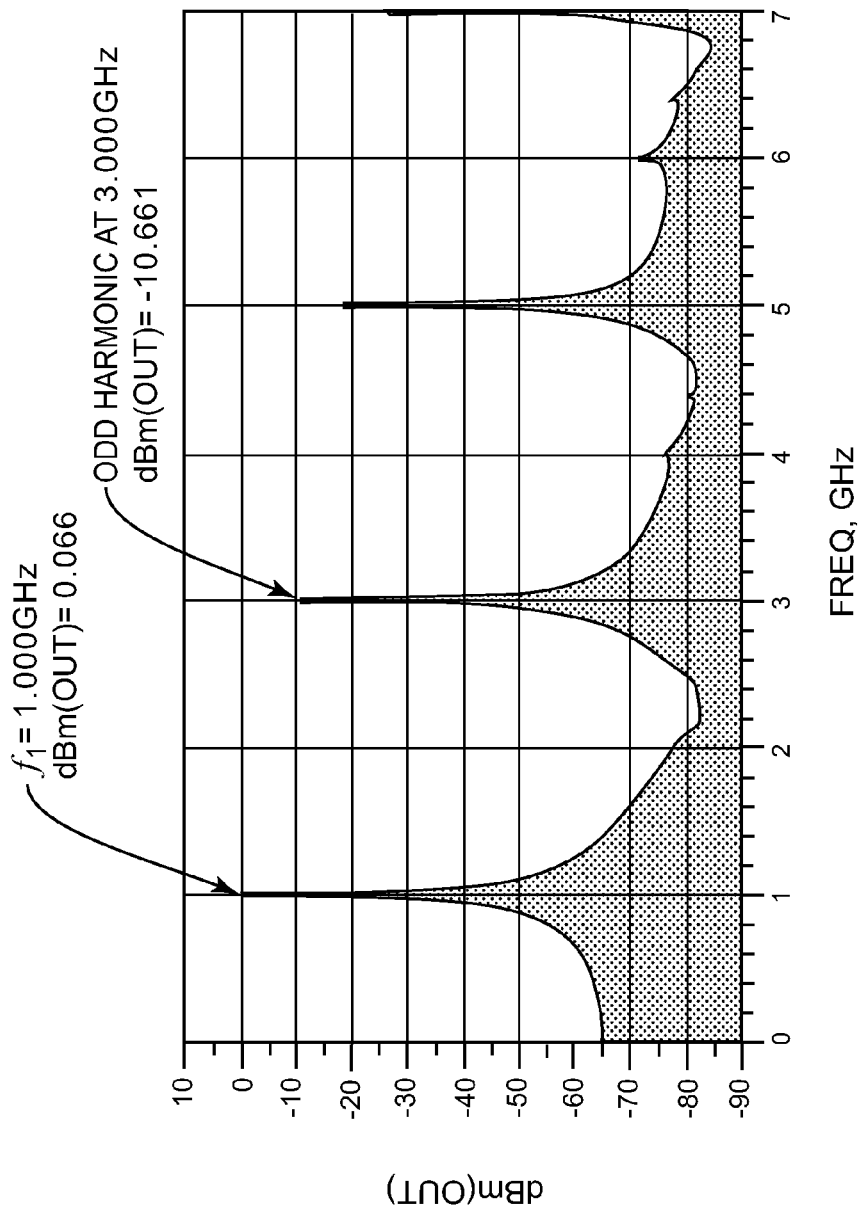
FIG. 6A shows an exemplary two-tone RF signal generated by the stimulus generator of FIG. 4.
Figure 6B:
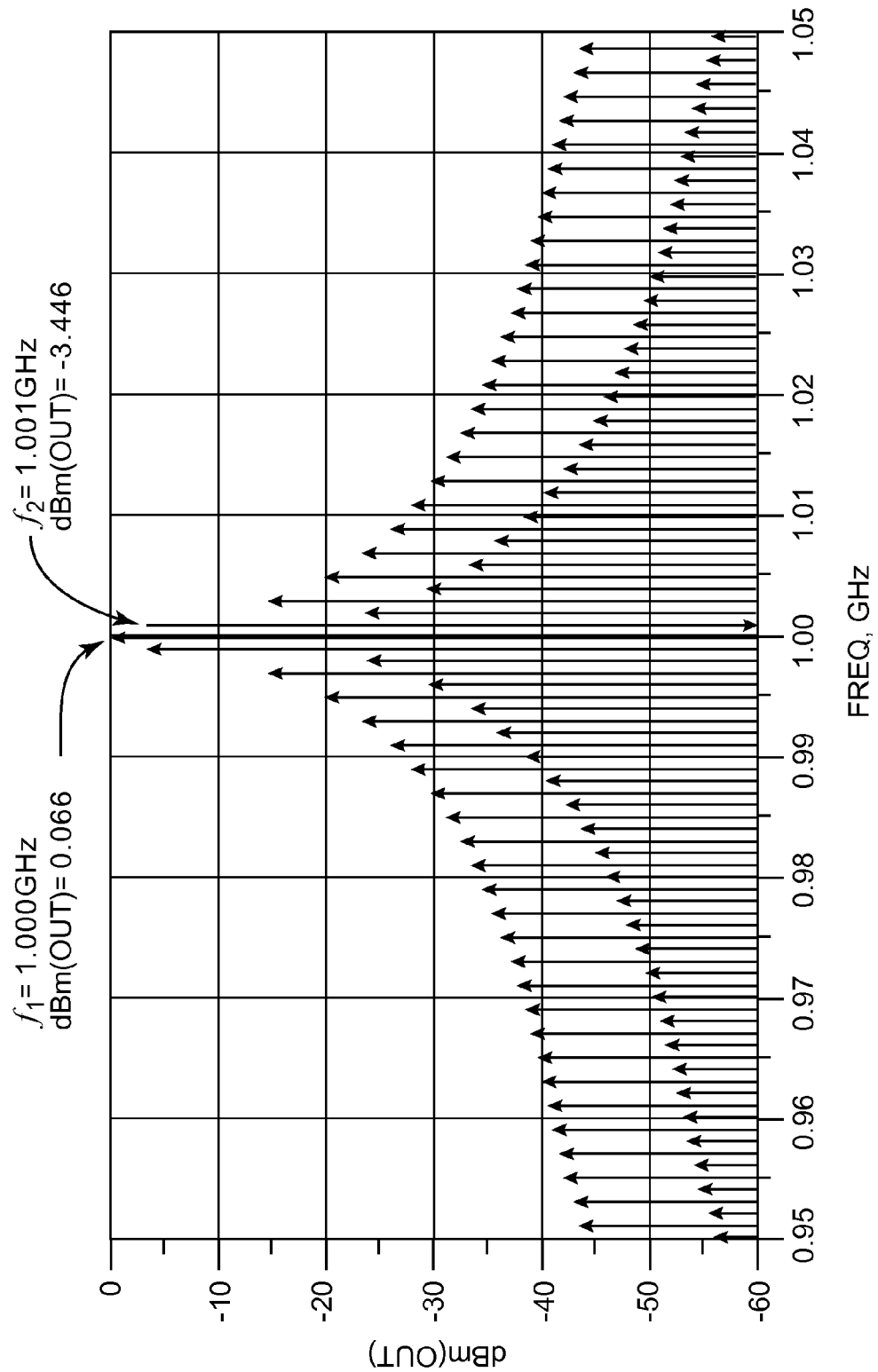
FIG. 6B shows a close-up of the exemplary two-tone RF signal generated by the stimulus generator of FIG. 4.

FIGS. 6A and 6B show the spectrum of an exemplary test signal as generated by the stimulus generator 100 when 100% amplitude modulation is used and when $f_1 = 1$ GHz and $f_{offset} = 1$ MHz. As shown in FIG. 6A, the spectrum repeats around every odd harmonic, where the even order harmonics are lower due to the imperfect 50% duty cycle of $f_1$ and $f_{offset}$. As shown in FIG. 6B, $f_2$ occurs as a modulation tone around the odd harmonic (e.g., $f_1$), where $f_2=1.001$ GHz is offset from $f_1=1$ GHz by $f_{offset}=1$ MHz.

As disclosed herein, the test signal frequency tones satisfy $f_2=f_1+f_{offset}$ and $$f_1 = Lf_{offset} = \frac{L}{M} f_{osc}.$$

If L comprises an integer, other non-linearities may introduce intermodulation tones at the same frequency (e.g., $f_{offset}=f_1-f_2$) as the IP2 tone because the spectrum of the test signal is located on a grid comprising multiples of $f_{offset}$ (see, e.g., FIG. 6A). Odd order distortions, e.g., third and fifth order distortions, therefore generate intermodulation terms at $2f_1 \pm f_2$, or $3f_1 \pm 2f_2$, or $4f_1 \pm f_2$. Further, even order distortion components are also located, e.g., at $f_1-f_2$. As a result, it may be difficult to separate the desired IP2 information from the other non-linearities that fall on the same frequency as the IM2 or any other desired intermodulation tones.

Figure 7:
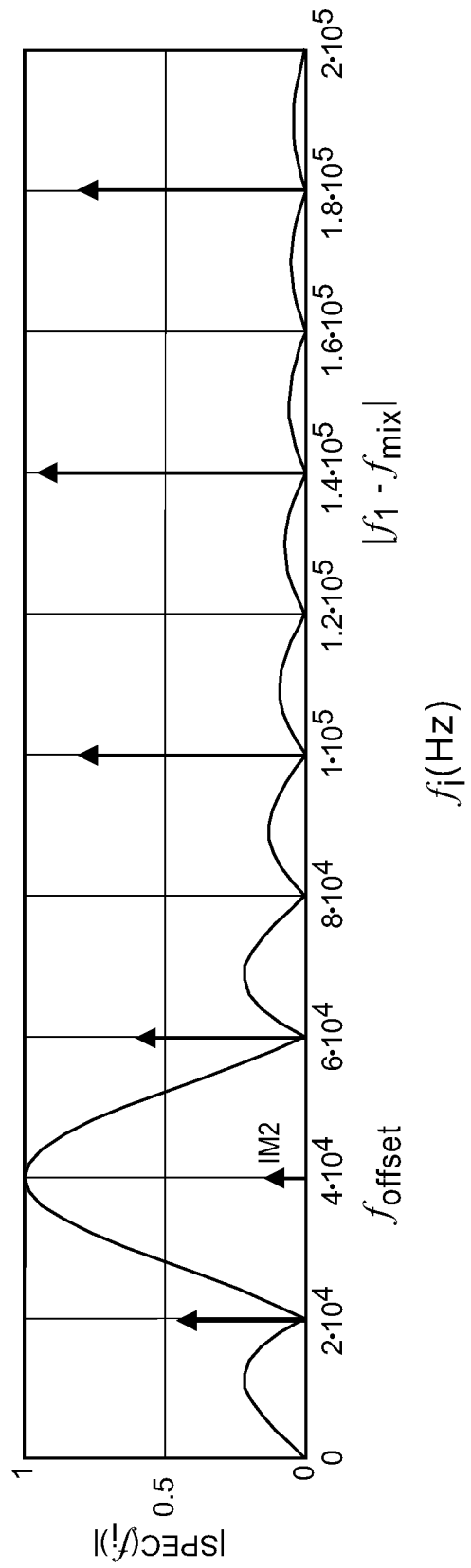
FIG. 7 shows the filter curve overlaying the spectrum response signal around the IM2 tone.

The solution disclosed herein addresses this problem by controlling the test signal generation such that L comprises a non-integer, e.g., L=0.5b, where b comprises an integer. The harmonics resulting from such a test signal now lie at a grid of $Lf_{offset}=0.5 f_{offset}+bf_{offset}$, and therefore, do not interfere with the IM2 tone located at $f_{offset}$. Thus, by selecting $f_{offset}$ in the bandwidth of the receiver 10, so that $f_1$ is a non-integer multiple of $f_{offset}$, the information located at $f_{offset}$ comprises only the desired even intermodulation tone. Filtering the output of the demodulator 40, e.g., by integrating the IM2 output tone for two periods of $f_{offset}$, produces the desired IM2 tone. By coinciding the harmonics of the demodulator output signal with the zeros of the filter, the desired IM2 tone is passed, while the other harmonics are filtered out, as shown in FIG. 7, where the y-axis represents the magnitude of the filter transfer function (unitless). Such a result is possible with an integration (filtering) time equal to an even amount of cycles of $f_{offset}$. It will be appreciated that the filter may be configured to center on any desired intermodulation tone.

To achieve the desired test signal, processor 18 may be configured to control the parameters used to generate the two-tone test signal, e.g., L and M. Consider the example where $f_1=0.14$ MHz and $f_{osc}=26$ MHz. Note that $f_1=Lf_{offset}=(0.5+b)f_{osc}/M$. One solution for $f_1=0.14$ MHz and $f_{osc}=26$ MHz produces b=3 and M=650, which produces an offset frequency of 40 kHz. In this scenario, processor 18 may control L and M such that L=3.5 and M=650.

The non-integer value L may comprise the integer value of b as offset by 0.5 to maximize the distance of the IM2 tone from any other harmonic. It will be appreciated, however, that the 0.5 offset value is not required and that any fractional offset value may be used.

The solution disclosed herein provides a built-in self-test system for testing a wireless receiver that relies on a single on-chip signal generator to provide the two-tone RF test signal. By reusing many existing receiver components, the impact of the built-in self-test system on the overall footprint of the receiver chip is minimized.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of testing a receiver to measure an intermodulation tone using a built-in self-test system, the method comprising:
   generating a test signal using a stimulus generator, the test signal comprising first and second tones at respective first and second frequencies, wherein the first and second frequencies are spaced by an offset frequency, wherein the first frequency comprises a non-integer multiple of the offset frequency, wherein a receiver downconversion mixer frequency comprises an integer multiple of the offset frequency, and wherein the offset frequency coincides with an intermodulation frequency of the intermodulation tone;
   applying the test signal to a downconverter of the receiver to downconvert the test signal to generate an In-phase component and a Quadrature component; and
   demodulating, in a demodulator of the receiver, the In-phase and Quadrature components based on a reference frequency to measure an amplitude of the intermodulation tone,
   wherein the stimulus generator, the downconverter, and the demodulator are disposed on a common receiver chip.

2. The method of claim 1 further comprising calculating a linearity parameter for the receiver based on the amplitude of the intermodulation tone.

3. The method of claim 2 wherein the intermodulation tone comprises a second order intermodulation tone, and wherein the linearity parameter comprises a second order intercept point.

4. The method of claim 2 wherein the intermodulation tone comprises a third order intermodulation tone, and wherein the linearity parameter comprises a third order intercept point.

5. The method of claim 1 wherein generating the test signal comprises:
   generating a first signal at the first frequency based on an oscillator output signal at an oscillator frequency;
   dividing the oscillator output signal by a first divisor to generate an offset signal at the offset frequency; and
   generating the test signal by switching the first signal on and off responsive to the offset signal.

6. The method of claim 5 wherein generating the first signal at the first frequency comprises:
   dividing the oscillator output signal by a second value to generate a third signal at a third frequency; and
   generating the first signal based on the third signal.

7. The method of claim 5 further comprising determining the non-integer multiple and the first divisor based on a desired relationship between the first frequency and the oscillator frequency.

8. The method of claim 7 wherein determining the non-integer multiple and the first divisor comprises determining the non-integer multiple and the first divisor satisfying $$f_1 = \frac{L}{M} f_{osc},$$

where $f_1$ represents the first frequency, $f_{osc}$ represents the oscillator frequency, L represents the non-integer multiple, and M represents the first divisor.

9. A built-in receiver self-test system for measuring an intermodulation tone, the system comprising:
- a stimulus generator configured to generate a test signal, the test signal comprising first and second tones at respective first and second frequencies, wherein the first and second frequencies are spaced by an offset frequency, wherein the first frequency comprises a non-integer multiple of the offset frequency, wherein a receiver downconversion mixer frequency comprises an integer multiple of the offset frequency, and wherein the offset frequency coincides with an intermodulation frequency of the intermodulation tone;
- a downconverter operatively connected to the stimulus generator and configured to downconvert the test signal to generate an In-phase component and a Quadrature component; and
- a demodulator operatively connected to the downconverter and configured to measure an amplitude of the intermodulation tone by demodulating the In-phase and Quadrature components based on a reference frequency, wherein the stimulus generator, the downconverter, and the demodulator are disposed on a common receiver chip.

10. The system of claim 9 further comprising a processor configured to calculate a linearity parameter for the receiver based on the amplitude of the intermodulation tone.

11. The system of claim 10 wherein the intermodulation tone comprises a second order intermodulation tone, and wherein the linearity parameter comprises a second order intercept point.

12. The system of claim 10 wherein the intermodulation tone comprises a third order intermodulation tone, and wherein the linearity parameter comprises a third order intercept point.

13. The system of claim 9 wherein the on-chip stimulus generator comprises:
- a first signal generator configured to generate a first signal at the first frequency based on an oscillator output signal at an oscillator frequency;
- a first divider to divide the oscillator output signal by a first value to generate an offset signal at the offset frequency; and
- a logic gate configured to generate the test signal by switching the first signal on and off responsive to the offset signal.

14. The system of claim 13 wherein the first signal generator comprises:
- a second divider to divide the oscillator output signal by a second value to generate a third signal at a third frequency; and
- a phase-locked loop configured to generate the first signal based on the third signal.

15. The system of claim 13 further comprising a processor configured to determine the non-integer multiple and the first divisor based on a desired relationship between the first frequency and the oscillator frequency.

16. The system of claim 15 wherein the processor determines the non-integer multiple and the first divisor to satisfy $$f_1 = \frac{L}{M} f_{osc},$$

where $f_1$ represents the first frequency, $f_{osc}$ represents the oscillator frequency, L represents the non-integer multiple, and M represents the first divisor.

17. A method of generating a test signal for a built-in receiver self-test system used to measure an intermodulation tone, the method comprising:
- generating a first signal at a first frequency based on an oscillator output signal at an oscillator frequency, said first frequency being less than said oscillator frequency;
- dividing the oscillator output signal by a first divisor to generate an offset signal at an offset frequency; and
- generating the test signal by switching the first signal on and off responsive to the offset signal, the test signal comprising a first tone at the first frequency and a second tone at a second frequency separated from the first frequency by the offset frequency, wherein the first frequency comprises a non-integer multiple of the offset frequency.

18. The method of claim 17 wherein the non-integer multiple comprises an integer value offset by 0.5.

19. The method of claim 17 further comprising determining the non-integer multiple and the first divisor based on a desired relationship between the first frequency and the oscillator frequency.

20. The method of claim 19 wherein determining the non-integer multiple and the first divisor comprises determining the non-integer multiple and the first divisor satisfying $$f_1 = \frac{L}{M} f_{osc},$$

where $f_1$ represents the first frequency, $f_{osc}$ represents the oscillator frequency, L represents the non-integer multiple, and M represents the first divisor.

21. The method of claim 17 wherein generating the first signal at the first frequency comprises:
- dividing the oscillator output signal by a second value to generate a third signal at a third frequency; and
- generating the first signal based on the third signal.

22. The method of claim 17 wherein the intermodulation tone comprises a second order intermodulation tone.

23. The method of claim 17 wherein the intermodulation tone comprises a third order intermodulation tone.

24. A test signal generator for a built-in receiver self-test system used to measure an intermodulation tone, the test signal generator comprising:
- a first signal generator configured to generate a first signal at a first frequency based on an oscillator output signal at an oscillator frequency;
- a first divider to divide the oscillator output signal by a first divisor to generate an offset signal at an offset frequency; and
- a logic gate operatively connected to an output of the first signal generator and the first divider, the logic gate configured to switch the first signal on and off responsive to the offset signal to generate the test signal, the test signal comprising a first tone at the first frequency and a second tone at a second frequency separated from the first frequency by the offset frequency, wherein the first frequency comprises a non-integer multiple of the offset frequency.

25. The test signal generator of claim 24 wherein the non-integer multiple comprises an integer value offset by 0.5.

26. The test signal generator of claim 24 further comprising a processor configured to determine the non-integer multiple and the first divisor based on a desired relationship between the first frequency and the oscillator frequency.

27. The test signal generator of claim 26 wherein the processor determines the non-integer multiple and the first divisor to satisfy $$f_1 = \frac{L}{M} f_{osc},$$

where $f_1$ represents the first frequency, $f_{osc}$ represents the oscillator frequency, L represents the non-integer multiple, and M represents the first divisor.

28. The test signal generator of claim 24 wherein the first signal generator comprises:
  a second divider to divide the oscillator output signal by a second divisor to generate a third signal at a third frequency; and
  a phase-locked loop configured to generate the first signal based on the third signal.

29. The test signal generator of claim 24 wherein the intermodulation tone comprises a second order intermodulation tone.

30. The test signal generator of claim 24 wherein the intermodulation tone comprises a third order intermodulation tone.

31. The test signal generator of claim 24 wherein the logic gate comprises an AND gate.

32. The test signal generator of claim 24 wherein the first signal generator, the first divider, and the logic gate are disposed on a receiver chip.

\* \* \* \* \*